Feb. 23, 1932.    I. W. BROGGER    1,846,182
ELECTRICAL MEASURING INSTRUMENT
Filed Feb. 11, 1930

Inventor
IVAR W. BROGGER
Attorney
A. D. T. Libby

Patented Feb. 23, 1932

1,846,182

UNITED STATES PATENT OFFICE

IVAR W. BROGGER, OF MERIDEN, CONNECTICUT, ASSIGNOR TO CONNECTICUT TELEPHONE & ELECTRIC CORPORATION, OF MERIDEN, CONNECTICUT

ELECTRICAL MEASURING INSTRUMENT

Application filed February 11, 1930. Serial No. 427,576.

This invention relates to an electrical measuring instrument for measuring current flowing in an electric circuit.

It is the principal object of my invention to produce an ammeter of a small number of parts and consequently at a very low cost, yet one which is rugged and substantial and especially adapted for use on automotive vehicles.

My invention will be readily understood by reference to the annexed drawings, wherein.

Figure 1:
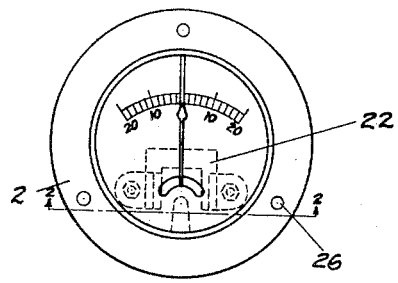
Figure 1 is a plan view of the instrument shown in its case, ready for mounting.
Figure 3:
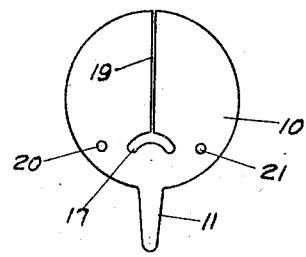
Figure 3 is a plan view of the dial without the indicia marks thereon.
Figure 2:
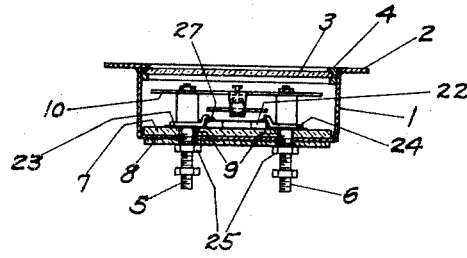
Figure 2 is a sectional view of Figure 1 on the line 2—2.
Figures 4, 5:
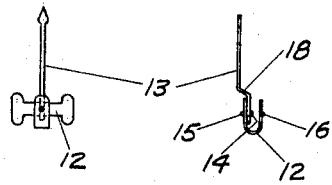
Figure 4 is a plan view of the movable member.
Figure 5 is a side elevation of Figure 4.

In the various views, wherein like numbers refer to corresponding parts, 1 is a casing having a mounting flange 2 with holes 26 therein for fastening the instrument. The face of the casing is closed with a transparent member such as a piece of glass 3, which is usually held in a resilient holding member 4. A pair of contact terminal studs 5 and 6 are carried by the casing, at least one of them, and preferably both, being insulated from the casing by insulators 7 and 8, and bushings 9.

Figure 6:
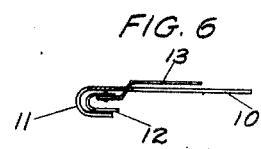
Figure 6 is a side elevation of the dial in its completed form and with the movable member mounted in position, ready to be placed in the instrument.

Carried on the inner ends of the studs 5 and 6 is a dial 10. The dial 10 is provided with a finger or projection 11 which is turned over as shown in Figure 6 to furnish a support for the armature 12 which comprises a part of the movable system. In the form shown, only two parts make up the movable system; i. e., the armature 12 and a pointer 13 which is preferably made with very light material such as aluminum. The pointer 13 may be fastened to the armature 12 in any satisfactory manner such as by a rivet 14, one end of which, 15, may act as a pivot for one side of the armature, while the material of the other portion of the armature may be punched outwardly to form the other pivot 16. The pivots 15 and 16 act with cooperating indentations in the finger 11 of the dial 10. Preferably, the armature 12 is I-shaped.

The dial 10 has an arcuate slot 17 to receive the bent portion 18 of the pointer 13; and the dial 10 is also slotted at 19 to direct the current across that part of the dial between the studs 5 and 6. Said studs have reduced ends that pass through the holes 20 and 21 respectively.

The passage of the current through the dial at the portion indicated, will set up a magnetic field which, reacting with the magnetic field set up by the magnet 22, acts on the armature 12 to turn the same and thereby the pointer, so giving the reading of the instrument. The magnet 22 is held in position by clamps 23 and 24. These clamps are carried on the studs 5 and 6, as indicated, so that when the studs are fastened to the casing by the nuts 25, the said clamps are drawn against the legs of the magnet 22, with an insulating member 27, such as a piece of fiber, between the clamps and the magnet; or the clamps may be of strong insulating material.

While I have shown the slot 19 as being substantially on the diameter, it will be obvious that it may be disposed on a segmental line from the arcuate slot 17, the main purpose being to separate the dial so as to force the current to travel through that part of the dial directly positioned between the studs.

Having thus described my invention, what I claim is:

1. An electrical measuring instrument including; a casing, a pair of contact studs supported by the casing and at least one of them being insulated therefrom, a dial carried by said studs and forming an electrical circuit therebetween, a magnet carried within the casing between said studs and held by clamps on said studs, said dial having an arm formed to support a movable system including a pointer and having an armature positioned between the pole ends of said magnet, whereby said pointer is normally held in zero position, said dial also having a slot extending from its periphery to a point nearly over the armature whereby the current through the dial will set up a flux which will react with the flux from the magnet to turn the armature and movable system.

2. An electrical measuring instrument including; a casing, a pair of contact studs supported by the casing and at least one of them being insulated therefrom, a dial carried by said studs and forming an electrical circuit therebetween, a magnet carried within the casing, said dial having an arm formed to support a movable system having an armature positioned adjacent said magnet, whereby said pointer is normally held in zero position, said dial being slotted from its periphery to a point nearly over said armature so the current through the dial will set up a flux which will react with the flux from the magnet to turn the armature and movable system, said slot being positioned immediately below the zero position of the pointer as and for the purpose described.

3. An electrical measuring instrument including; a pair of contact terminal studs, a magnet having its pole ends positioned between said studs, clamps carried by the studs for holding the magnet in place, a dial carried by said studs and having a part completing the only current path between said studs, an armature pivoted on a part of said dial adjacent that part of the dial between said studs and within the field of the magnet, a pointer operated by the armature, said dial being slotted so as to direct the current through that part of the dial between and closely adjacent said studs, whereby the flux set up by the current through the dial will coact with the flux from the magnet to act on said armature as described.

In testimony whereof I affix my signature.

IVAR W. BROGGER.